United States Patent
Ajmera et al.

(10) Patent No.: US 10,192,457 B2
(45) Date of Patent: *Jan. 29, 2019

(54) ENHANCING KNOWLEDGE BASES USING RICH SOCIAL MEDIA

(75) Inventors: Jitendra Ajmera, New Delhi (IN); Shantanu Ravindra Godbole, New Delhi (IN); Himabindu Lakkaraju, Bangalore (IN); Bernard Andrew Roden, Middleton, WI (US); Ashish Verma, New Delhi (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 89 days.

This patent is subject to a terminal disclaimer.

(21) Appl. No.: 13/408,547

(22) Filed: Feb. 29, 2012

(65) Prior Publication Data

US 2013/0224713 A1 Aug. 29, 2013

(51) Int. Cl.
*G09B 7/00* (2006.01)

(52) U.S. Cl.
CPC .................................. *G09B 7/00* (2013.01)

(58) Field of Classification Search
CPC .............. G06F 17/30864; G06F 17/27; G06F 17/2775; G06F 17/2809; G06F 17/3043; G06F 17/30654; G06F 17/30684; G06F 17/30734; G09B 7/00; G09B 7/02; G06Q 50/01; G10L 15/18; G10L 15/1815; G10L 15/183; G10L 15/22; G10L 15/30; H04L 51/32; Y10S 707/99936

USPC .......................................................... 434/322
See application file for complete search history.

(56) References Cited

U.S. PATENT DOCUMENTS

| | | | |
|---|---|---|---|
| 6,411,936 B1 | 6/2002 | Sanders | |
| 6,499,024 B1 | 12/2002 | Stier et al. | |
| 7,930,302 B2 | 4/2011 | Bandaru et al. | |
| 2003/0028525 A1* | 2/2003 | Santos et al. | 707/3 |
| 2004/0030556 A1* | 2/2004 | Bennett | 704/270 |
| 2006/0036562 A1 | 2/2006 | Wu | |
| 2006/0085750 A1* | 4/2006 | Easton et al. | 715/708 |
| 2007/0255702 A1* | 11/2007 | Orme | 707/5 |
| 2008/0133488 A1* | 6/2008 | Bandaru et al. | 707/3 |
| 2009/0306996 A1 | 12/2009 | Tsaparas et al. | |
| 2010/0063797 A1* | 3/2010 | Cong et al. | 704/9 |
| 2011/0055699 A1 | 3/2011 | Li et al. | |
| 2011/0082825 A1* | 4/2011 | Sathish et al. | 706/46 |

(Continued)

OTHER PUBLICATIONS

Cooke, Nancy J., "Knowledge Elicitation", publication available on-line on Feb. 27, 2012, at http://cerici.org/documents/Publications/Durso%20chapter%20on%20KE.pdf, 59 pages, New Mexico State University, Las Cruces, New Mexico.

(Continued)

*Primary Examiner* — Nathan Hillery

(74) *Attorney, Agent, or Firm* — Ference & Associates LLC

(57) ABSTRACT

Methods and arrangements for developing knowledge bases from social media. A question is obtained from social media. Social media are consulted, and a legitimacy of the question is ascertained. All the answers to the question are harvested from the social media including the rich media that is associated with these answers, and the question is filtered out if determined not to be legitimate.

10 Claims, 3 Drawing Sheets

(56) References Cited

U.S. PATENT DOCUMENTS

2011/0106895 A1* 5/2011 Ventilla et al. ............... 709/206
2011/0125734 A1* 5/2011 Duboue et al. ............... 707/723
2012/0171654 A1* 7/2012 D'Angelo et al. ............ 434/322

OTHER PUBLICATIONS

Agichtein, E., et al., "Finding High-Quality Content in Social Media", First ACM International Conference on Web Search and Data Mining, WDSM 2008, Feb. 11-12, 2008, 11 pages, Palo Alto, California Surdeanu, M., et al., "Learning to Rank Answers on Large Online QA Collections", 46th Annual Meeting of the Association for Computational Linguistics, Human Language Technologies, Jun. 15-20, 2008, 9 pages, Columbus, Ohio.

Wen, J-Rong, et al., "Clustering user queries of a search engine", Proceedings of the Tenth International World Wide Web Conference, WWW 10, May 1-5, 2001, pp. 162-168, Hong Kong, China.

\* cited by examiner

ENHANCING KNOWLEDGE BASES USING RICH SOCIAL MEDIA

BACKGROUND

Social media have provided an efficient platform for users to find finding solutions to problems, concerns and questions. Discussion boards, forums and other social networking websites are increasingly used for this purpose. Since one-to-one communication between an information-seeker and information-provider is not involved, it can be said that a query posted on social media often goes through a "collaborative thinking" process where one gets multiple, sometimes partial, responses from an attendant community. Some forums also permit a mechanism where the original posters and other members of the community can provide feedback (e.g., vote) on such responses. However, viable arrangements for facilitating such feedback have proven to be elusive.

BRIEF SUMMARY

In summary, one aspect of the invention provides a method comprising: obtaining a question; consulting social media; ascertaining a legitimacy of the question; harvesting from the social media an answer to the question; and filtering out the question if the question is not determined to be legitimate.

Another aspect of the invention provides an apparatus comprising: at least one processor; and a computer readable storage medium having computer readable program code embodied therewith and executable by the at least one processor, the computer readable program code comprising: computer readable program code configured to obtain a question; computer readable program code configured to consult social media; computer readable program code configured to ascertain a legitimacy of the question; computer readable program code configured to harvest from the social media an answer to the question; and filtering out the question if the question is not determined to be legitimate.

An additional aspect of the invention provides a computer program product comprising: a computer readable storage medium having computer readable program code embodied therewith, the computer readable program code comprising: computer readable program code configured to obtain a question; computer readable program code configured to consult social media; computer readable program code configured to ascertain a legitimacy of the question; computer readable program code configured to harvest from the social media an answer to the question; and filtering out the question if the question is not determined to be legitimate.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
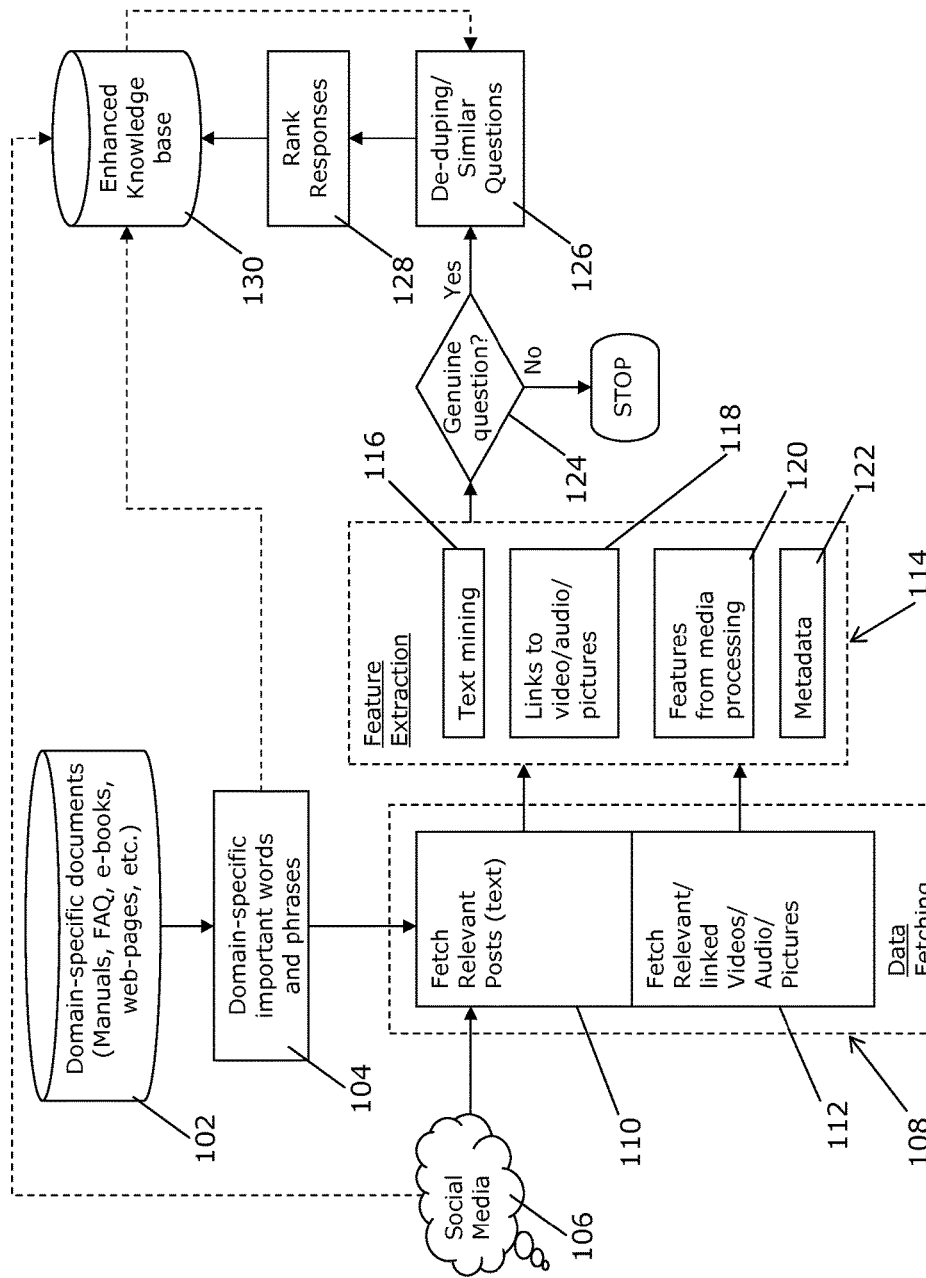
FIG. 1 schematically illustrates an arrangement for obtaining question data from social media.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure now turns to FIG. 1. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIG. 1 can be performed or utilized by way of a processing unit or units and system memory such as those indicated, respectively, at 16' and 28' in FIG. 3, whether on a server computer, a client computer, a node computer in a distributed network, or any combination thereof.

Broadly contemplated herein, in accordance with at least one embodiment of the invention, is the extraction of genuine questions and corresponding viable solutions, pertaining to a particular domain, automatically from social media conversations. Such solutions can include just text, but may include instead or in addition rich media such as video, audio, photographs, links to such media, at least one podcast, etc. (This list is simply provided by way of illustrative and non-restrictive example, and it should be appreciated that a great variety of rich media can be employed in the context of embodiments of the invention.) The conversations can be stored and indexed as additional knowledge-bases by enterprises in that domain, in addition to existing internal documents being stored. Alternatively, the mined information can be used to augment existing knowledge bases that might already have an incomplete set of questions and answers in FAQ (frequently asked question) form. Consequently, a currency of social media discussions is admirably made use of, and knowledge bases that may be outdated, lacking in maintenance, and/or essentially "stale" from being constructed but once in the past, end up being augmented. The enhanced knowledge bases can be effectively used for FAQ, customer service, and troubleshooting, among many other possible applications.

Generally, it can be noted that among different uses and applications of social media such as connecting with friends and sharing opinions, an important mode of communication is the answering of questions. A noted advantage of social media over other traditional communication channels is that collaborative thinking is fostered; e.g., an information-seeker gets answers, sometimes partial, from other users and deduces best solutions from these. A feedback mechanism (e.g., voting) further helps the seeker in finding the best solution.

In accordance with at least one embodiment of the invention, domain-specific communication data are obtained from a number of social media forums. While conventionally there do exist some dedicated question-answering forums and moderated domain-specific discussion forums, many of these queries appear on other un-moderated informal forums (e.g., "Facebook" and "Twitter"). Such un-moderated informal forums can be found to contain a preponderance of irrelevant information. The relevant communications can also include complaints, suggestions, announcements, acknowledgements and the like. Even in the case of question-answering forums, not all questions can emerge as important or interesting, and there are also cases where questions might be asked in a manner that displays negative sentiment or sarcasm. Questions such as these are filtered out or ruled out in embodiments of the invention.

In accordance with at least one embodiment of the invention, in recognition of the possibility of people asking essentially the same question in a variety of forms, e.g., using synonyms or different sequences of words, duplicates can be removed. Thus, to enhance the searchability of such questions, they can be "de-duped" (have duplicates removed), or similar questions can be found in the case of new questions that are not strictly exact duplicates of old ones. Either way, previous answers can be consulted when a duplicate or new question is posted on the same forum. This is also helpful when all such data, containing previous answers, is stored in a database and used by an enterprise in that domain to solve problems of the customers (e.g. customer service). Text analytics techniques for finding similar questions or de-duping can be employed herein.

In accordance with at least one embodiment of the invention, in order to be able to use a database as an additional knowledge-base for an enterprise, relevant answers can be found and ranked. To do this, feedback is used from other forum-members and text analytics techniques are employed to find "similarity" between questions and the answers, which serves as a basis for ranking. The ranking also considers other features which can be automatically extracted from the data, as discussed further below.

In accordance with at least one embodiment of the invention, the text analytics and ranking techniques summarized above can be also employed to enrich knowledge bases that may already exist in an enterprise monitoring social media and whose products or services are being discussed. Once the best questions and answers are extracted, the existing knowledge bases/FAQs can be searched to determine if a question exists in the knowledge base. If it does, then the social media answer is attached to the question in addition to an existing answer, thereby representing the enterprise's view of typical solutions and an end-consumer's view of a typical solution.

In accordance with at least one embodiment of the invention, questions and answers can be mined via arrangements other than text analytics or other static graphics. Particularly, in as much as online video sites have become very popular sources for troubleshooting and "how-to" answers for internet users and end-customers, techniques as broadly contemplated herein can also be employed to find out popular troubleshooting tips or "how-to" videos uploaded by users. Similarly, a video so found can be added to existing knowledge bases such that a link can be provided to the video in addition to a text-based or diagram-based explanation of the solution of a problem. In a setting where no knowledge base exists, an information repository can continue to be built as explained hereinabove.

In accordance with at least one embodiment of the invention, it will generally be appreciated that there are broadly contemplated herein methods and arrangements for providing automated solutions to leveraging social media communications to enhance domain-specific (or organization-specific) knowledge bases using social media.

By way of a general overview, domain-specific communication data are first obtained from a number of social media forums. Relevant communications are extracted (e.g., by looking for domain-specific keywords or phrases) from this data. From this relevant subset, postings are extracted which have a question-pattern, such as "how can I", or "can I still get". (Also contemplated here are essentially any type of information-seeking patterns that might not necessarily be in the form of a conventional question. For instance, a relevant posting might be in the form of a "requesting" sentence such as, "I would like to know . . . " or "I am looking for information on . . . ".) Next, sentiment information is used to further filter out posts that do not pose legitimate questions or queries, such as a negative question, e.g., on the order of "How can you make such a bad product?" A de-duping step is then performed to identify queries which are essentially the same but asked in different ways. Responses corresponding to the aforementioned questions/queries are also analyzed for domain-specific keywords to rule out irrelevant responses and other potential spam. The answers are ranked, based on keywords and feedback (e.g., votes) from other members on the forum in question. The questions and the responses are finally stored in a database, or augment an existing such database, by adding new questions or enhancing responses of existing questions. As mentioned, an enhancement can include links to suitable multimedia content (e.g., "how-to" videos on a video website). The applications of this database include dynamic FAQ updating, customer service (where the agent queries this database while interacting with a customer) and troubleshooting, among other applications.

In accordance with at least one embodiment of the invention, and as illustrated schematically in FIG. 1, from manuals, domain-specific web-pages, technical forums, user-manuals, books etc. (102), frequently used keywords and phrases that are domain-specific are obtained (104). From different forums and social media websites (106), data are fetched (108) using the keywords/phrases 104. The data so fetched can include text data from posts (110) and video/audio/pictures (112) that are linked, referred to or relevant to such posts. In a feature extraction step 114, four sets of features can be extracted: text from text mining (116) and links to video/audio/pictures (118), metadata associated with the linked media such as date-of-posting, creator, location, tags etc. (120) and features resulting from suitable audio processing such as transcription obtained by running a speech recognizer on an audio clip (122).

In accordance with at least one embodiment of the invention, genuine questions are identified as discussed hereinabove (124). If a question is identified as not being genuine, the process stops. Otherwise, in a filtering step, concepts (e.g., keywords and phrases and their synonyms) are identified in these questions in order to find duplicate or similar questions previously asked, if any (126). Responses to the question (or to previous similar questions) are then collected and ranked (128), and questions and answers are then stored to a database constituting an enhanced knowledge base (130).

In accordance with at least one embodiment of the invention, by way of further detail according to at least one illustrative and non-restrictive example, keywords and phrases (104) are extracted by analyzing domain-specific documents such as e-books, online manuals, technical forums, etc. 102. A number of suitable techniques exist for this purpose including tf-idf (i.e., term frequency-inverse document frequency weighting as commonly employed in information retrieval and text mining). A clustering step can also be performed, where similar or synonymous keywords are grouped together. As social media communications 106 often involve shorthand expressions, intentional spelling mistakes, and other linguistic variations, such variations are considered as well for finding the synonyms. The two groups of input (104 and 106) are later used in de-duping step 126.

In accordance with at least one embodiment of the invention, it can be noted that the relevant social media 106 for an enterprise can include dedicated discussion forums hosted by an enterprise itself, enterprise webpages on popular social forum websites or a general question-and-answer forum. In the case where it is a dedicated and moderated forum, all the communications can be downloaded and analyzed. However, in the case of general forums, relevant communications are fetched by issuing search queries that include keywords and phrases extracted in an earlier step.

In accordance with at least one embodiment of the invention, in step 124, relevant posts can be analyzed, as discussed further above, for question patterns like "how can I", or "what is the". An exhaustive list of such patterns will cover all the questions. However, there may be exceptions. Sometimes people use question patterns to demonstrate sarcasm and negative sentiment. More information can be extracted from the discussion such as sentiment, author reputation, nature of the responses, number of sentences etc. to further rule out these exceptions. (By way of an illustrative and non-restrictive example, steps such as these can be carried out via a statistical binary classifier. The classifier, as such, would be trained to accept any or all such features as input and assign a class label [e.g., "question" or "not a question" to the corresponding post.)

In accordance with at least one embodiment of the invention, in step 126, when a new question comes in, similar questions from the previously stored data (as stored in enhanced knowledge base 130, and derived from sources such as 104 and 106) are determined using text clustering and text analytics techniques. (By way of an illustrative and non-restrictive example, the following publication includes a discussion of some such techniques that can be employed in the context of embodiments of the invention: Wen, et al., "Clustering User Queries of a Search Engine", pp. 162-168, WWW'01.) These techniques themselves exploit the previously determined synonyms or similar terms for each keyword and phrase. If the similarity is higher than a threshold, the new question is considered to be a duplicate of the existing question.

In accordance with at least one embodiment of the invention, in step 128, once the questions have been de-duplicated and/or grouped, the responses for these questions are also grouped up. These answers can then be ranked based at least on the following features:

1. Similarity of keywords and phrases between the original question and the response. (The ranking also considers synonymous nature of the keywords while determining this similarity.)
2. Corresponding feedback (e.g., votes, likes, dislikes, number of comments etc.) if a feedback mechanism is used.
3. "Author influence," wherein previous author posts and responses are analyzed for domain-specific content and nature of posts (spam, query, complaint etc.).
4. If available, status of the author such as company representative, expert, etc.
5. Presence of entities such as phone-numbers, email addresses, URL, dates, link to audio/video or other media, etc.
6. Presence of ignore words or foul language, thereby carrying a negative weight in the ranking function.
7. Sentiment expressed.
8. Sarcasm expressed (negatively ranked).
9. Metadata associated with other media, if any.
10. Features extracted from suitable media processing.

In accordance with at least one embodiment of the invention, any of a wide variety of suitable algorithms or methods may be employed for determining and/or weighting any and all of the above-listed features. For instance, one such method can involve votes or likes (as in point 2 hereinabove) as a target value of a regression function. The weights of various features in such a regression function can then be optimized by minimizing a least-square error or similar objective function or factor.

Figure 2:
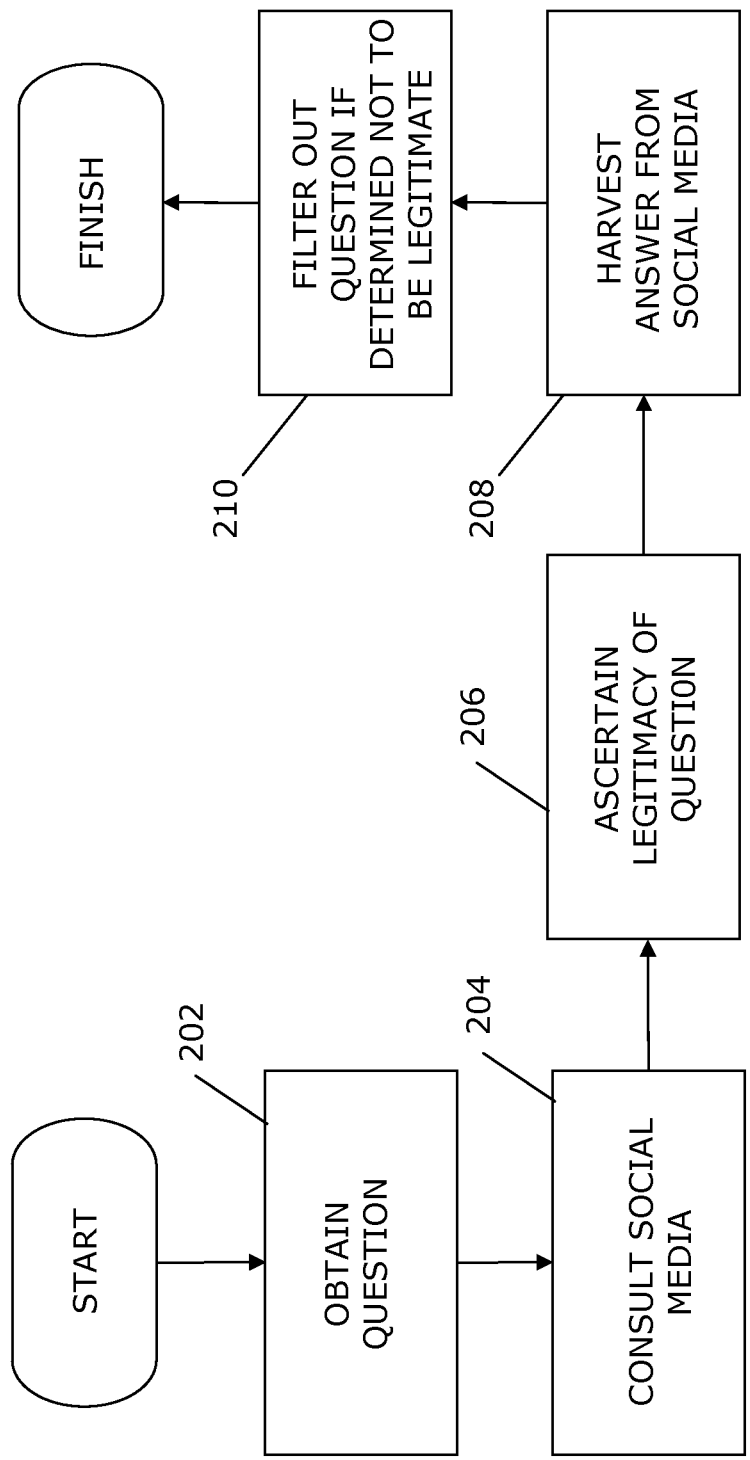
FIG. 2 sets forth a process more generally for developing knowledge bases from social media.

FIG. 2 sets forth a process more generally for developing knowledge bases from social media, in accordance with at least one embodiment of the invention. It should be appreciated that a process such as that broadly illustrated in FIG. 2 can be carried out on essentially any suitable computer system or set of computer systems, which may, by way of an illustrative and on-restrictive example, include a system such as that indicated at 12' in FIG. 3. In accordance with an example embodiment, most if not all of the process steps discussed with respect to FIG. 2 can be performed by way of a processing unit or units and system memory such as those indicated, respectively, at 16' and 28' in FIG. 3.

As shown in FIG. 2, a question is obtained (202). Social media are consulted (204), and a legitimacy of the question is ascertained (206). An answer to the question is harvested from the social media (208), and the question is filtered out if determined not to be legitimate (210).

Figure 3:
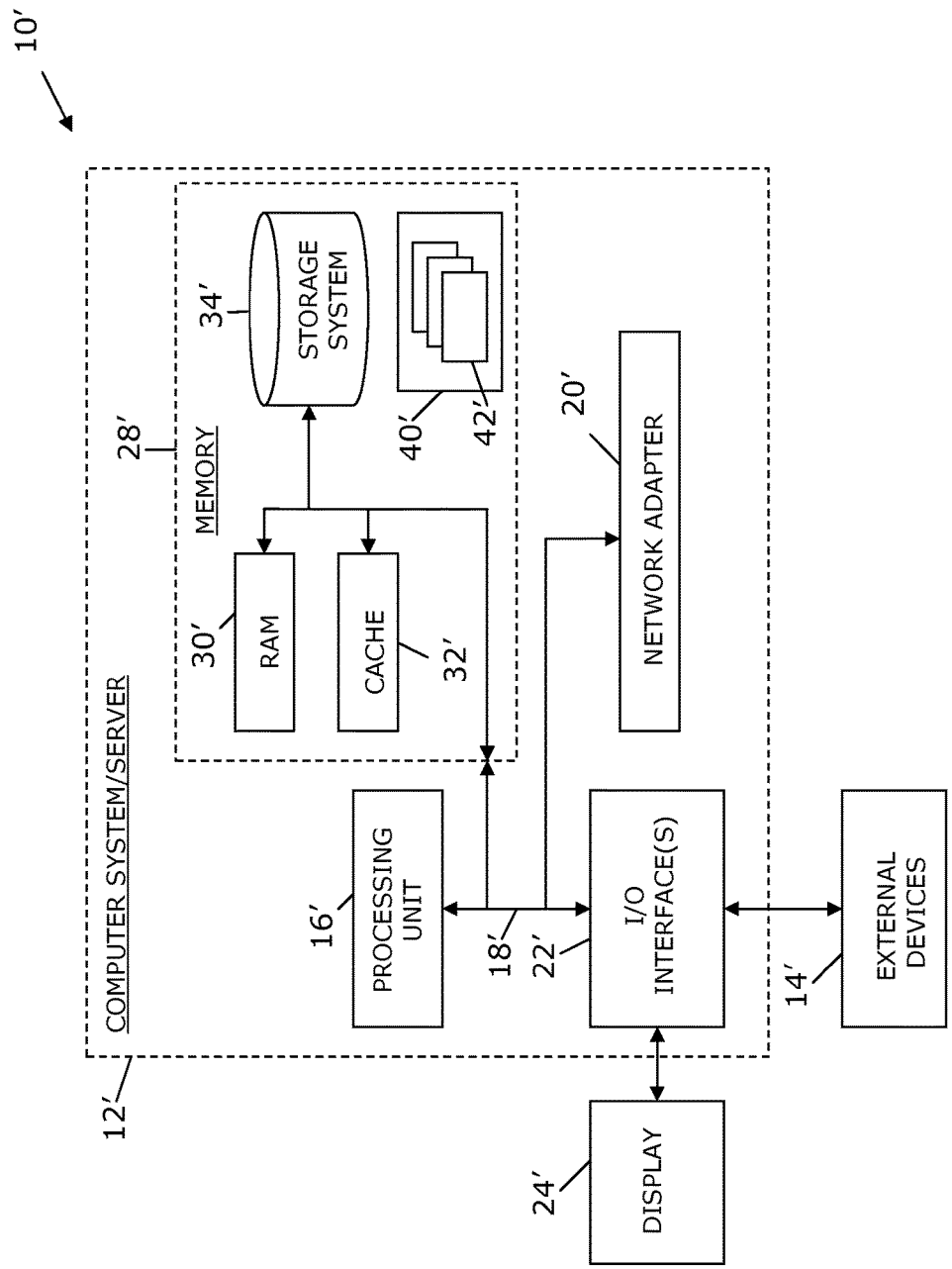
FIG. 3 illustrates a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   at least one processor; and
   a computer readable storage medium having computer readable program code embodied therewith and executable by the at least one processor, the computer readable program code comprising:
   computer readable program code configured to establish at least one legitimacy standard for filtering questions, wherein the at least one legitimacy standard includes presence of a question pattern and at least one exception relative to the question pattern, wherein a question pattern identifies data as requesting additional information;
   computer readable program code configured to automatically obtain a question from at least one social media conversation, wherein to obtain a question comprises obtaining data from at least one social media forum, extracting domain-specific communications directed to a target domain by filtering the data using domain-specific keywords, and identifying questions from the extracted domain-specific communications by determining presence of a question pattern;
   computer readable program code configured to ascertain a legitimacy of the question, based on the at least one legitimacy standard, via:
     determining presence of a question pattern within the obtained data; and
     determining presence of at least one exception to the question pattern, wherein an exception indicates that the data identified as corresponding to a question pattern should not be answered;
  wherein the determined at least one exception to the question pattern comprises at least one of: sentiment, author reputation, nature of one or more responses to the question, and a number of sentences relative to the question;
computer readable program code configured to classify, based upon the ascertained legitimacy, the automatically obtained question as legitimate or not legitimate, wherein a legitimate question comprises obtained data identified as containing a question pattern and as not containing at least one exception to the question pattern, wherein a not legitimate question comprises obtained data identified as containing a question pattern and containing at least one exception to the question pattern;
computer readable program code configured to filter out the automatically obtained questions classified as not legitimate;
computer readable program code configured to harvest, for the automatically obtained questions classified as legitimate, from at least one social media conversation an answer to the question, wherein the harvesting comprises:
  harvesting an answer comprising at least one rich media component taken from the group consisting of: video content; audio content; picture content; and
  harvesting text associated with the at least one rich media component; and
computer readable program code configured to augment an existing question knowledge base corresponding to the target domain using the questions classified as legitimate and including the harvested answer corresponding to the question; and
computer readable program code configured to automatically provide an answer the automatically obtained question using the harvested answer.

2. A computer program product comprising:
a non-transitory computer readable storage medium having computer readable program code embodied therewith, the computer readable program code comprising:
computer readable program code configured to establish at least one legitimacy standard for filtering questions, wherein the at least one legitimacy standard includes presence of a question pattern and at least one exception relative to the question pattern, wherein a question pattern identifies data as requesting additional information;
computer readable program code configured to automatically obtain a question from at least one social media conversation, wherein to obtain a question comprises obtaining data from at least one social media forum, extracting domain-specific communications directed to a target domain by filtering the data using domain-specific keywords, and identifying questions from the extracted domain-specific communications by determining presence of a question pattern;
computer readable program code configured to ascertain a legitimacy of the question, based on the at least one legitimacy standard, via:
  determining presence of a question pattern within the obtained data; and
  determining presence of at least one exception to the question pattern,
  wherein an exception indicates that the data identified as corresponding to a question pattern should not be answered;
  wherein the determined at least one exception to the question pattern comprises at least one of: sentiment, author reputation, nature of one or more responses to the question, and a number of sentences relative to the question;
computer readable program code configured to classify, based upon the ascertained legitimacy, the automatically obtained question as legitimate or not legitimate, wherein a legitimate question comprises obtained data identified as containing a question pattern and as not containing at least one exception to the question pattern, wherein a not legitimate question comprises obtained data identified as containing a question pattern and containing at least one exception to the question pattern:,
computer readable program code configured to filter out the automatically obtained questions classified as not legitimate;
computer readable program code configured to harvest, for the automatically obtained questions classified as legitimate, from at least one social media conversation an answer to the question, wherein the harvesting comprises:
  harvesting an answer comprising at least one rich media component taken from the group consisting of: video content; audio content; picture content; and
  harvesting text associated with the at least one rich media component;
and
computer readable program code configured to augment an existing question knowledge base corresponding to the target domain using the questions classified as legitimate and including the harvested answer corresponding to the question; and
computer readable program code configured to automatically provide an answer the automatically obtained question using the harvested answer.

3. The computer program product according to claim 2, wherein said computer readable program code is further configured to ascertain whether the question is a duplicate of a previously obtained question, and thereupon consulting an answer to the previously obtained question.

4. The computer program product according to claim 2, wherein said computer readable program code is further configured to ascertain whether the question is similar to a previously obtained question, and thereupon consulting an answer to the previously obtained question.

5. The computer program product according to claim 2, wherein said computer readable program code is further configured to apply media processing to the at least one rich media component.

6. The computer program product according to claim 5, wherein:
the at least one rich media component comprises audio content; and
the media processing comprises speech recognition.

7. The computer program product according to claim 2, wherein said computer readable program code is further configured to:
rank answers to the question; and
store the ranked answers in an enhanced knowledge database.

8. The computer program product according to claim 2, wherein said computer readable program code is configured to obtain the question from social media.

9. The apparatus according to claim 1, wherein the metadata include one or more of: date-of-posting, creator, location, and tags.

10. The computer program product according to claim 2, wherein the metadata include one or more of: date-of-posting, creator, location, and tags.

* * * * *